Figure 1:
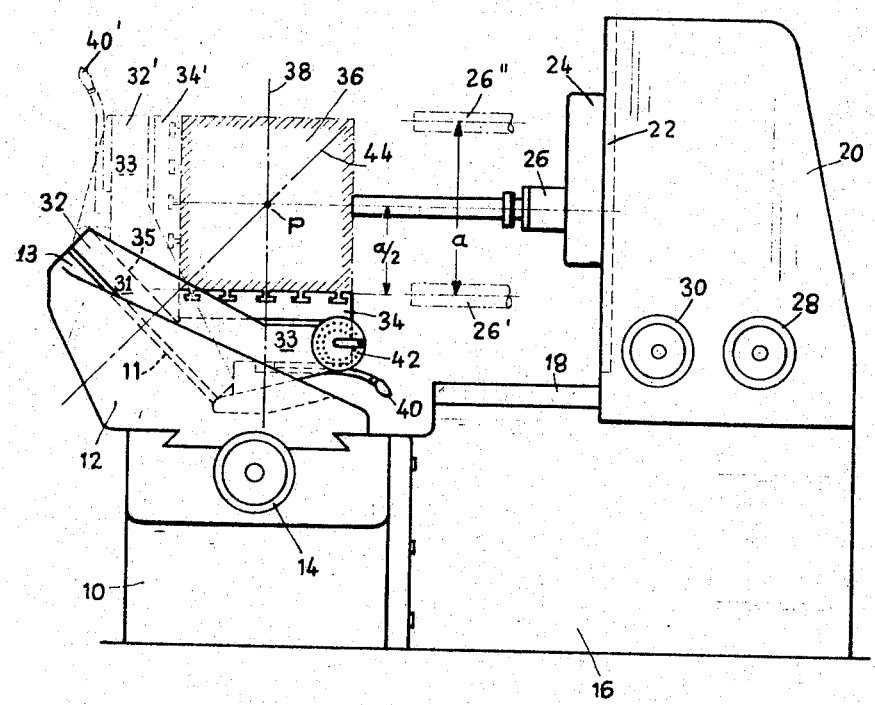

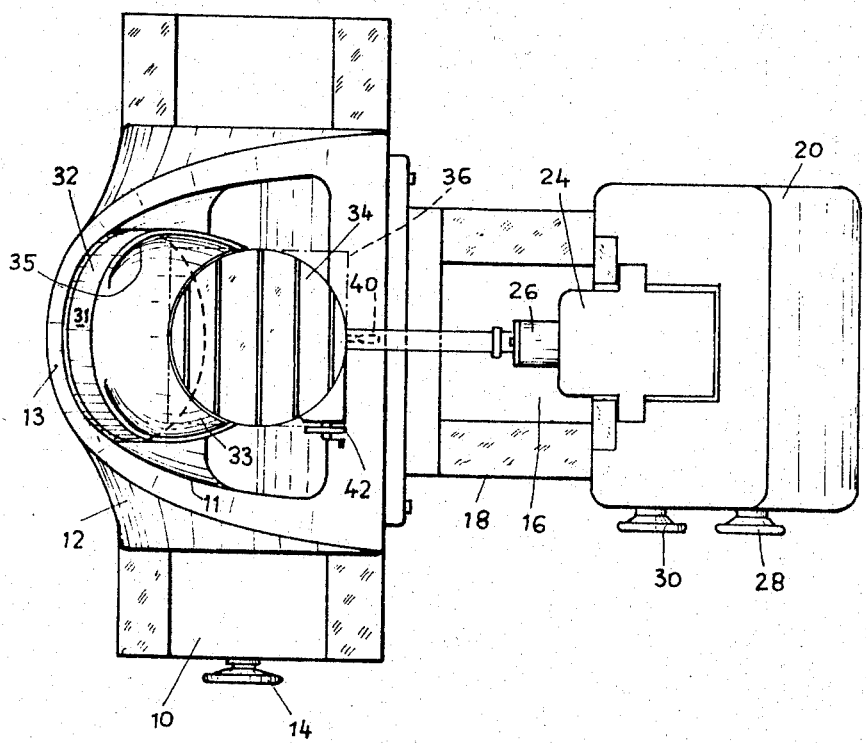

United States Patent Office 3,361,033
Patented Jan. 2, 1968

3,361,033
ROTATING AND SWIVELING CLAMPING TABLE
FOR MACHINE TOOLS
Johann Muller, Munich, Germany, assignor to Hans
Deckel, Munich, Germany, and Friedrich Wilhelm
Deckel, Zug, Switzerland
Filed Aug. 17, 1965, Ser. No. 480,464
Claims priority, application Germany, Aug. 28, 1964,
D 45,295
6 Claims. (Cl. 90—58)

This invention is an improvement on the clamping table disclosed in copending application Ser. No. 258,482, filed Feb. 14, 1963, now Patent No. 3,248,101, by Johann Muller and Horst Lazenberger, for "Dual Swivel Axes Clamping Table," owned by a common assignee.

This invention relates broadly to machine tool clamping tables, and more particularly to a clamping table in which the clamping surface and the workpiece carried thereby can be brought from a vertical into a horizontal position, and vice versa, with slight effort, and in which the swivel and rotation axes of the clamping surface are positioned so as to enable the working range of operation of the machine tool used in conjunction therewith to be best utilized for machining all five surfaces of the workpiece on the clamping surface or plate.

Clamping tables for machine tools are known in the prior art in which the clamping plate can rotate about an axis extending at right angles to the plane of the clamping plate to provide a turntable, and in which this axis itself can be swiveled about a swivel axis intersecting it an angle of approximately 45 degrees. With this arrangement a workpiece on the clamping plate can be brought into any position in space so that its entire surface can be machined with a machine tool spindle, with the exception of the side of the workpiece which bears on the clamping plate, without having to change the direction or attitude of the machine tool working spindle axis or without having to reclamp the workpiece on the clamping plate.

However, the known clamping tables of the prior art of this type have the disadvantage that the mass of the workpiece must be lifted a considerable amount or distance when the workpiece is brought from a vertical position into a horizontal position such as adjacent a machine tool spindle. The operator must then exert considerable lifting work at great effort to swivel the workpiece and table from one position to another. This problem is the subject of previously mentioned copending application Ser. No. 258,482, filed Feb. 14, 1963 by Johann Muller and Horst Lanzenberger, and it discloses a clamping table structure which indicates a solution to the problem of how to avoid the necessity of exerting lifting work when moving the workpiece and clamping plate from the vertical to the horizontal position. The clamping table of the present invention also provides a solution to this problem and enables the workpiece and clamping surface to be swiveled from one attitude to another with the exertion of little or no lifting work. This advantage of the clamping table of the present invention will not be discussed in detail in this specification since it was discussed in the previously-filed mentioned application.

It is, therefore, an object of the present invention to provide a construction of clamping table which enables a workpiece secured to the clamping plate to be swiveled from a vertical into a horizontal position, and vice versa with the exertion of little or no lifting work.

In the known clamping tables of the prior art, heretofore set forth, when the workpiece is brought from one position, such as the vertical position, into another position, such as the horizontal position, there is a substantial change in the vertical position of the workpiece in space, and this presents the additional disadvantage that the machine tool must have a corresponding vertical working range so that its horizontal working spindle can work on or machine the entire workpiece, both in its lowest and its highest positions. The foregoing consideration pertains to the problem involved with a machine tool having a horizontally disposed working spindle and the result is that a machine with a certain working range can only operate on a workpiece of substantially smaller dimensions when a clamping table is utilized. The optimum condition would be that a machine with a set working range can operate on a workpiece having dimensions corresponding to the working range to thus enable a larger workpiece to be machined by the machine tool when a clamping table is utilized than can presently be machined when using prior art clamping tables.

Similar considerations also apply to machine tools having a vertically disposed working spindle which moves in a horizontal working range. In this situation, the rotation of the clamping plate plane with the workpiece thereon from a vertical into a horizontal position results in a substantial variation of the horizontal positioning of the workpiece in space, that is, there is a substantially horizontal distance from the position of the workpiece before and the position of the workpiece after the clamping table is swiveled. This prior art arrangement thus requires a corresponding shifting of the working range of the vertical spindle in horizontal transverse direction to machine all sides of the workpiece. The clamping table of the present invention eliminates this drastic variation in positioning of the workpiece in space when the table is swiveled and, although, in the following specification and drawings the problem and the solution are shown and described in connection with a machine tool having only a horizontal working spindle, it is to be understood and can be appreciated by one skilled in the art that the clamping table performs in the same manner with a machine tool having a vertically disposed working spindle.

The problem of eliminating the foregoing disadvantage of the substantial distance between the positions of the workpiece in space, in the different attitudes of the clamping table, can be formulated in several ways:

(a) The clamping table should offer the workpiece to the horizontal (or vertical) tool spindle in all table positions at the same vertical level (at the same horizontal distance from the machine tool upright);

(b) The clamping table should permit the utilization of the entire shifting or working range of the machine tool in the vertical (horizontal transverse) direction, as previously mentioned, for the range to be used entirely for machining a workpiece surface, without requiring additional shifting paths as with present clamping tables depending on the swivel position of the table, which additional shifting paths are not entirely used for machining operations;

(c) The machine tool and the rotating and swiveling clamping table should be so adapted to each other that the maximum working range of the machine tool spindle is not reduced by using a table swiveling about two axes intersecting each other in an angle of 45 degrees.

All three formulations obviously amount to the same and have a common structure solution.

The clamping table of the present invention is described in the following specification as a solution of the problem formulated according to (c) and the structure and operation of the clamping table is thus described with respect to its relation to a machine tool and the working range of the tool spindle. The solution of the problem is provided by a construction of a clamping table in which the top surface of the clamping plate faces the intersection of the two axes and is disposed at a distance of $a/2$ from it where $a$ is the distance by which the working tool spindle and the workpiece are mutually adjustable in vertical or transverse direction, that is, $a$ represents the working or shifting range of the machine tool.

It is thus an object of the present invention to provide a construction of a clamping table which positions a workpiece clamped thereon at the same vertical level in space and the same horizontal distance from a predetermined vertical axis when the workpiece is swiveled by the table from a vertical attitude into a horizontal attitude, and vice versa.

Another object of the invention is to provide a clamping table for use with a machine tool which does not reduce the useable working range of the machine tool but enables the working range to be effectively used for machining a workpiece throughout the entire range in all positions of the table.

Another object of the invention is to provide a construction of rotating and swiveling clamping table in which the rotating and swiveling axes intersect outwardly of the clamping plate so that the clamping plate faces the intersection of the two axes.

By using a clamping table constructed in accordance with the manner set forth above, having two axes intersecting each other at an angle of 45 degrees, a workpiece which requires the entire shifting range or working range of the machine tool, for machining its surfaces can now be machined by the tools by using the table of the present invention, and this has not been possible with known prior art clamping tables of this type. It is thus another object of the present invention to provide a construction of machine tool clamping table having a rotating and swiveling axis intersecting each other at substantially 45 degrees which enables a workpiece having dimensions the same as the working range of a machine tool to be machined on all surfaces by the machine tool.

Even without consideration of gaining the advantage of use of the full maximum shifting range or working range of the machine tool for machining a workpiece the clamping table of the present invention also provides the advantage, which is also an object, of positioning the workpiece so that no additional adjusting movements of the machine tool or spindle are required for operating on the workpiece in the two adjusted positions thereof.

Other and further objects of the invention will become apparent to one skilled in the art from the following specification and drawings which describe and illustrate the invention in association with an illustrative horizontal spindle machine tool, but it is to be understood that the invention is also useable with vertical spindle machine tools and the like although not illustrated, in which:

FIG. 1 is a side elevational view showing the clamping table with a milling machine having a horizontal working spindle as an embodiment of the invention, with the clamping table shown in an adjusted position in dotted lines, and the workpiece shown in dotted lines; and FIG. 2 is a top plan view of the clamping table and milling machine of FIG. 1.

Referring to the drawings in greater detail, a carriage or clamping table base member 12 is connected in horizontal guides on the machine tool bench 10 for displacement along the bench in longitudinal direction by means of the handwheel 14, connected in the usual manner. A cross-bench 16 is connected at right angles with bench 10 by means of screws or the like, and carries cross guides 18 on its top surface which extend at substantially right angles to the horizontal guides on bench 10. Upright or pedestal body portion 20 of the milling machine is connected for horizontal movement along cross guides 18 and on the side facing carriage 12 is provided with vertical guides 22 to which spindle head 24 is guidingly connected for vertical movement. Spindle head 24 supports a horizontal working spindle 26 for machining workpiece 36, and this working spindle may be designed as an axially displaceable spindle sleeve where necessary. In FIG. 1 the vertical shifting range of the working spindle 26 is indicate by reference $a$ and is defined by the lowest operating position of the spindle indicated in dotted lines at 26' and the uppermost operating position of the working spindle indicated in dotted lines at 26". Pedestal body portion 20 is connected to be transversely shiftable toward and away from the workpiece by selective operation of handwheel 28 through conventional gearing, not shown, while spindle head 24 is connected to be selectively vertically shifted up and down vertical guides 22 by handwheel 30 in the usual manner, to shift working spindle 20 through the vertical working range of $a$. In lieu of hand operation of the milling machine, the spindles of the handwheels 14, 28 and 30 can be driven by other mechanical means, well known in the art, to provide automatic operation of the machine tool.

Carriage or base member 12 of the clamping table is provided with a dished recess 11 on its upper inclined surface forming an upwardly inclined portion indicated at 13, on the side of carriage 12 furthest from the working spindle. The upper surface of upwardly inclined portion 13 formed by the dished recess is disposed at substantially 45° to the horizontal. Intermediate table portion 32 is formed to fit within the dished recess 11 and comprises a first portion 31 formed at an acute angle to a second portion 33. First portion 31 is provided with a lower surface disposed adjacent the upper surface of upwardly inclined portion 13 and inclined at substantially the same angle, namely 45°, and intermediate table portion 32 is connected through first portion 31 to swivel about a pivot on axis 44 supported on the upwardly inclined portion 13 of carriage 12. Thus the intermediate portion 32 is arranged to swivel within recess 11 of carriage 12 and the swiveling operation is controlled by a handwheel mechanism or the like, not shown, but of the conventional type used in the art. Intermediate portion 32 is provided with a dished recess 35 on its upper surface forming a horizontal top surface on second portion 33 when in the position shown in full lines in FIG. 1.

Clamping table plate 34 to which workpiece 36 is secured in the usual manner, is pivotally connected along axis 38 to intermediate portion 32 and more specifically to the top surface of second portion 33. The clamping plate 34 is thus connected to rotate about an axis 38 extending at a right angle to the plane of the clamping plate, and can be locked in any selected rotated position, through mechanism not shown, by a hand lever 40. An indexing attachment 42, of known construction, connected to intermediate portion 32 can be used for rotating the clamping plate 34 to a selected position.

In FIGS. 1 and 2 the clamping plate 34 has been shown in circular form for purposes of illustration, but it is to be understood that the clamping plate can also be of square or rectangular configuration. Also for purposes of illustration, the workpiece 36 has been illustrated in dotted lines as a cubic block having a side dimension $a$, that is, the largest symmetrical dimensions of a workpiece which can be clamped on the table since this dimension is also the diameter or width of the table. It is to be understood, however, that workpieces of other configuration can be clamped on the table and the one illustrated is only to show the operation of the table with the largest size workpiece it can handle since this size workpiece utilizes the entire working range $a$ of the working spindle.

The axis 38 about which clamping plate 34 rotates is thus supported by intermediate table portion 32 which in turn can swivel about the axis 44 supported by carriage 12. The plane of clamping plate 34 is disposed at an angle of 45° to axis 44, and the axes 38 and 44 intersect each other at an angle of 45° at the point P, which is the spatial center point of a workpiece with the maximum dimensions which can be machined by the machine tool. The top surface of the clamping plate 34 always faces the point P and is disposed at a distance of $a/2$ from point P, that is, a distance of half the vertical working range (or half the horizontal working range in the case of a vertical spindle machine tool) of the working spindle 26.

In operation, with the clamping table in the position indicated in solid lines in FIGS. 1 and 2, the four vertical sides of the workpiece 36 can be rotated to face the spindle 26 by rotating clamping plate 34 about the axis 38, so that they can be machined by the working spindle. In order to machine the fifth side of the workpiece, that is, the side of the workpiece opposite the side clamped on the clamping plate, the fifth side, which is in a horizontal position with the table in the position shown in full line, is brought into a vertical position by swiveling intermediate portion 32 of the clamping table 180° about the axis 44 relative to carriage 12, such that intermediate portion 32 and clamping plate 34 occupy the positions indicated in dotted lines at 32' and 34', at right angles to their former respective positions. The fifth side of the workpiece, in the case of a cubic workpiece, is then exactly in the position which one of the other four sides had occupied in the original position of the clamping table, that is in a position adjacent the spindle and at right angles thereto.

It can thus be seen that the vertical shifting or working range *a* alone of the horizontal spindle 26 is utilized for the range to be worked on the workpiece. It is to be understood that carriage 12 may be shifted longitudinally during the machining of a workpiece and/or clamping plate 34 can be rotated to bring all points of the workpiece adjacent the spindle. The working range *a* in all positions of the clamping table and workpiece can be used throughout the length for machining operations, when the maximum size workpiece is on the clamping plate, and no portion of the working range is wasted for repositioning of the spindle when the workpiece is swiveled from the vertical attitude to the horizontal attitude since the workpiece is positioned in both instances at the same vertical level in space. A corresponding phenomena occurs in conjunction with a vertical spindle machine tool. In addition, since the workpiece ends up in the same point, in space when the table is swiveled, although it is in a turned position, little if any lifting of the center of gravity of the workpiece and movable portions of the table is required, depending upon the size of the workpiece, and thus an operator can easily swivel a workpiece, even of the maximum size, on the table from one position to another, with only slight effort.

While the invention has been shown and described in certain embodiments it is realized that modifications can be made and other embodiments utilized, some of which have been mentioned, and it is to be understood that no limitations on the invention are intended other than those imposed by the scope of the appended claims.

What I claim as new and desire to secure by Letters Patent of the United States, is as follows:

1. A machine tool clamping table comprising, a clamping plate for a workpiece, an intermediate portion, and a base portion, said clamping plate pivotally connected to said intermediate portion to rotate about a pivot axis normal to the plane of said clamping plate, said intermediate portion pivotally connected to said base portion along a swivel axis intersecting the pivot axis at substantially 45°, and said clamping plate having an upper surface facing the point of intersection of the pivot and swivel axes.

2. A machine tool clamping table, as set forth in claim 1, in which said intermediate portion is pivotally connected within a dished recess on the upper surface of said base portion, and said intermediate portion operable to swivel within the dished recess to move the surface of said clamping plate from a horizontal plane into a vertical plane and vice versa.

3. A machine tool clamping table as set forth in claim 1 in which said intermediate portion is provided with a dished recess on the upper surface thereof forming an upper sufrace portion extending at substantially 45° to the swivel axis, and said clamping plate pivotally connected to said upper surface portion.

4. A machine tool clamping table as set forth in claim 1 in which said pivot axis is disposed substantially centrally of said clamping plate, and said clamping plate is positioned substantially to one side of said swivel axis and disposed at substantially 45° thereto.

5. In a machine tool with a clamping table for a workpiece to be machined by the tool, said clamping table including a clamping plate for the workpiece connected to rotate about a pivot means along a pivot axis normal to the plane of said clamping plate, said pivot means swivelly connected to said clamping table to swivel about a swivel axis intersecting the pivot axis at substantially 45°, said machine tool connected adjacent said clamping table and displaceable in a predetermined direction relative to a workpiece on said clamping table, and said clamping plate having an upper surface facing to the point of intersection of said pivot and swivel axes and positioned a distance of *a*/2 from said pionf of intersection, wherein *a* is the range through which said machine tool and the workpiece are displaceable to each other in the predetermined direction.

6. In a machine tool with a clamping table connected in spaced relation of the type in which said machine tool is displaceable through a working range *a*, in a predetermined direction relative to a workpiece on the clamping table for machining the workpiece, said clamping table including a clamping plate for the workpiece connected to rotate about a pivot means along a pivot axis normal to the plane of said clamping plate, said pivot means swivelly connected to said clamping table to swivel about a swivel axis intersecting the pivot axis at substantially 45°, the improvement comprising said clamping plate having an upper surface facing to the point of intersection of said pivot and swivel axes and positioned a distance of *a*/2 from said point of intersection.

References Cited

UNITED STATES PATENTS

| 1,155,987 | 10/1915 | Beckett | 90—58 |
| 1,979,536 | 2/1929 | Edgar | 51—218 |

FOREIGN PATENTS 117,577  11/1946  Sweden.

ROBERT C. RIORDON, *Primary Examiner.*

D. R. MELTON, *Assistant Examiner.*